United States Patent

Freeman

Patent Number: 6,014,146
Date of Patent: Jan. 11, 2000

[54] SHAPE MANIPULATION SYSTEM

[75] Inventor: William T. Freeman, Acton, Mass.

[73] Assignee: Mitsubishi Electric Information Technology Center America, Inc. (ITA), Cambridge, Mass.

[21] Appl. No.: 08/841,800

[22] Filed: May 5, 1997

[51] Int. Cl.[7] .................................................. G06F 15/00
[52] U.S. Cl. ............................................................ 345/435
[58] Field of Search ..................................... 345/435, 113, 345/114, 429, 430

[56] References Cited

U.S. PATENT DOCUMENTS 5,736,991  4/1998  Tada ......................................... 345/474

*Primary Examiner*—Phu K. Nguyen
*Attorney, Agent, or Firm*—Dirk Brinkman

[57] ABSTRACT

In a graphical object manipulation system, a system for modifying shapes includes representing a reference shape in terms of particles making up the shape, providing a Coulomb warp between the particles of the reference shape and those of a target shape, modifying the Coulomb warp and using the modified warp to generate a modified target shape from the reference shape by displacing particles in the reference shape to modified positions in the target shape based on modified displacements. The system permits shape averaging or providing a shape with a distinctive style.

8 Claims, 6 Drawing Sheets

STEP 1     TAKE A SHAPE & TRANSFORM IT INTO A COULOMB WARP REPRESENTATION

STEP 2     MANIPULATE TRANSFORM

STEP 3     RENDER RESULT

SHAPE MANIPULATION SYSTEM

FIELD OF INVENTION

This invention relates to graphical manipulation and, more particularly, to a system for combining and manipulating shapes.

BACKGROUND OF THE INVENTION

In general, it is desirable to be able to alter a graphical object in some simple and automatic way to give it a predetermined "style". For instance, taking letters of the alphabet, it is useful to give the letters a particular style such as Roman, Courier, etc. In order to do this, it is desirable to be able to transform an original rendering of a letter into a representation amenable to subsequent automatic machine modification which changes the letter into one having the required style by the application of some process so that all the letters look substantially consistent.

Likewise, in general it is desirable to give a predetermined characteristic to a graphical object so that all of the graphical objects come out rendered in a similar style.

Moreover, it is useful to be able to average shapes or combine two shapes by interpolation or extrapolation. Such transformations have not been easy in the past because one must analyze the shapes to identify important features. This is followed by an adhoc combination which in the past has been somewhat unsuccessful.

SUMMARY OF THE INVENTION

In order to provide for shape interpolation or extrapolation or the provision of a given style to a graphical object, a system is provided for altering an original shape by using a particle model to represent the shape such that the shape is represented by a collection of particles. A warp or mapping is then used to describe the displacement of each particle from a reference shape to the shape to be represented. While in the above embodiment, the warp is found by utilizing a Coulomb warp heuristic, in another embodiment, a nearest neighbor heuristic is used.

The use of the warp particle representation permits a simple linear operation to be applied to a shape such as averaging with other shapes, in which the final shape is improved by the linear operation.

In one embodiment, a shape called the target shape, is represented by a set of displacements that a set of particles would have to undergo from a reference shape to the target shape. The displacements are found by giving each particle of the reference shape a unit charge and each particle of the target shape a negative charge proportional to the intensity of a bit map representation of this shape. The total charge of the target shape is set equal to the total charge of the reference shape. Electrostatic force lines, calculated from Coulomb's Law, are tracked from each particle of the reference shape to where they intersect the plane of the target shape, set to be in front of and parallel to the reference shape.

The displacement for each particle of the reference shape is set to be the position where the electrostatic force line originating at the particle intersects the plane of the target shape. Because the force lines land in uniform density over the target shape, the resulting Coulomb warp displacement map is a smooth continuous warp map from each pixel in the reference shape to positions in the target shape. It has been found that, using the Coulomb warp map, similar shapes are represented by similar warp maps, a property that allows for simple averaging or extrapolation between shapes.

In summary, in a graphical object manipulation system, a system for modifying shapes includes representing an reference shape in terms of particles making up the shape, providing a Coulomb warp between the particles of the reference shape and those of a target shape, modifying the Coulomb warp and using the modified warp to generate a modified target shape from the reference shape by displacing particles in the reference shape to modified positions in the target shape based on modified displacements. The system permits shape averaging or providing a shape with a distinctive style, or other graphical manipulations of the shape.

In one embodiment, bit maps of an reference target shape and a reference shape are generated, with the reference shape being a reference grid, and with the intersection of the grid lines defining the positions of the particles. The displacement of each particle of the reference shape to positions of the target shape is determined, thus to define for each particle of the reference shape, where to displace the particle in order to form the target shape. The set of displacements is stored as the Coulomb warp which is to be manipulated by interpolation or extrapolation to obtain a modified warp. In one embodiment, manipulation is accomplished by averaging a warp with the warp map describing another shape to provide a modified Coulomb warp. For instance, to obtain an average between two shapes, the manipulation merely entails averaging the displacements for a given particle from the reference shape to two different target shapes representing the shapes to be averaged. The modified Coulomb warp is then rendered by converting back to a bit map to display the modified shape, with the modification being accomplished by the simple operation involving modification of the displacements.

BRIEF DESCRIPTION OF THE DRAWINGS

These and other features of the Subject Invention will be better understood in conjunction with the Detailed Description taken in conjunction with the Drawing of which.

DETAILED DESCRIPTION OF THE DRAWINGS

Figure 1A:
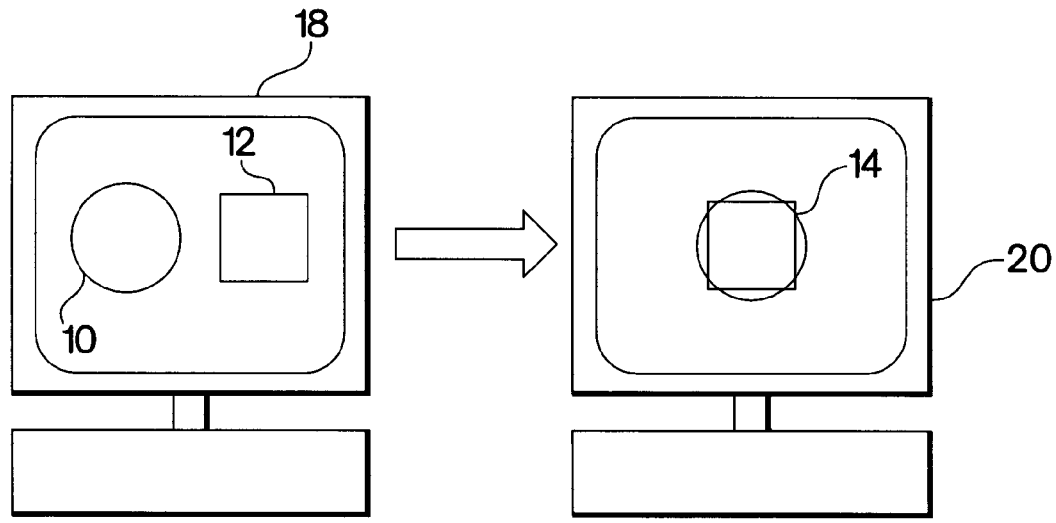
FIG. 1A is a diagrammatic representation of the result of a prior art method for combining a circle and a square to form a combined shape.

Referring now to FIG. 1A, as illustrated a set of shapes 10 and 12 are to be combined into a final shape 14, in this embodiment through the use of pixel averaging. As can be seen, the shapes displayed on monitor 18, when averaged in this manner, produce the result depicted on monitor 20 in which the rendered shape looks like a photographic double exposure of the two shapes. This is a result of pixel averaging, which in general is not a particularly good technique for combining two shapes into a third shape.

Figure 1B:
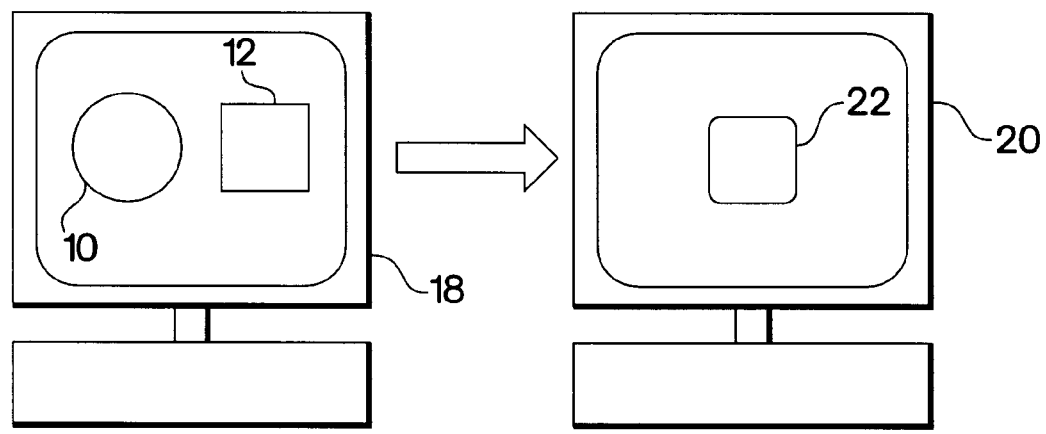
FIG. 1B is a diagrammatic representation of the result of using the subject system for combining a circle and a square.

Referring to FIG. 1B, assuming the same shapes 10 and 12, these shapes can be combined into a combined shape 22 as seen on monitor 20 in which the characteristics of the square and the characteristics of the circle are combined to provide a more realistic combination of the two.

Figure 2A:
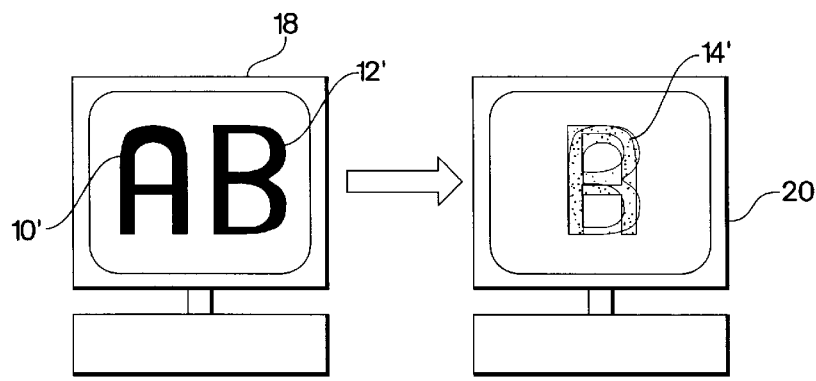
FIG. 2A is a diagrammatic representation of the result of a prior art method for combining shapes A and B to form a combined shape.
Figure 2B:
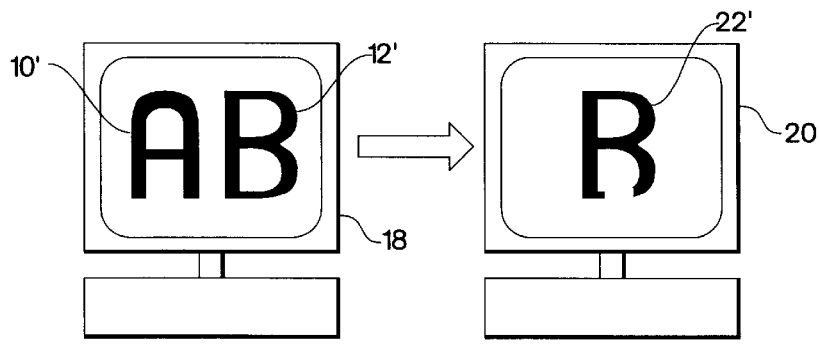
FIG. 2B is a diagrammatic representation of the results of utilizing the subject system for combining the shapes A and B.

Referring now to FIGS. 2A and 2B, the same results can be seen for the combination of the letters A and B; respectively 10' and 12' with the resultant shapes 14' and 22'.

What will be appreciated is that pixel averaging in general provides a distorted combined shape, whereas, as will be demonstrated, the utilization of a warp, but more particularly a Coulomb warp representation of each of the shapes, provides a shape which appears to be intermediate to each of the combined shapes for a more intuitively true combination.

Figure 3:
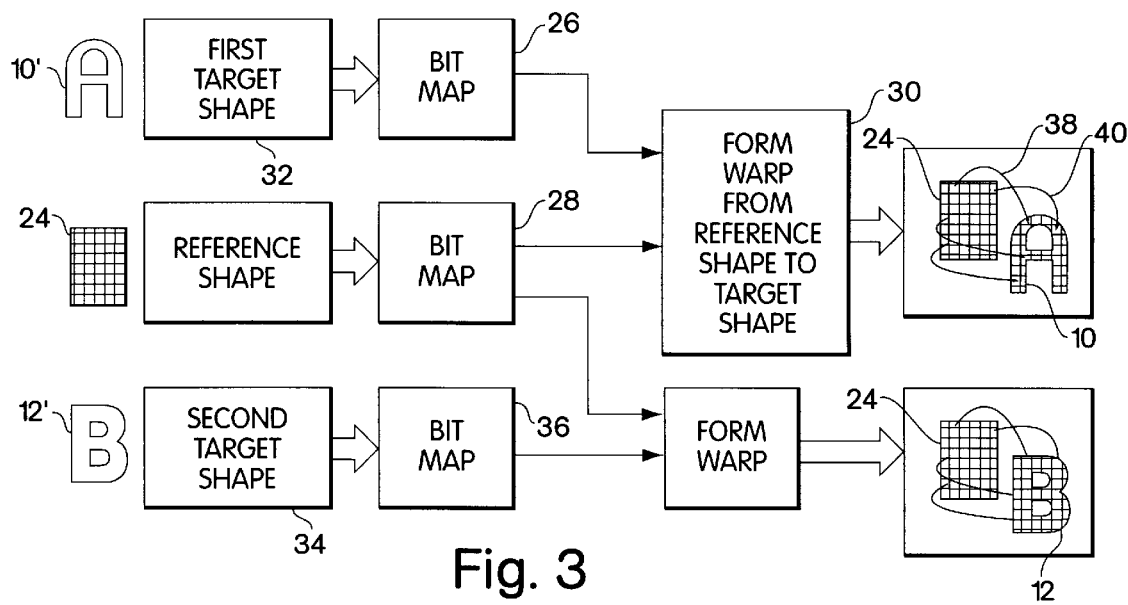
FIG. 3 is a block diagram illustrating the formation of a warp from bit maps representing a target shape and a reference shape with the warp being the displacement from positions on the reference shape, to positions on the target shape.

Referring now to FIG. 3, in the subject invention it is necessary to form a warp between a reference shape 24 and a target shape, here indicated by shape 10', with the reference shape and the target shape being converted into bit maps 26 and 28 respectively. The bit maps designate the position of each pixels on the shape in terms of an X and Y location. It is the purpose of the subject invention to first form a warp, here illustrated at 30, which defines the displacements between points on a reference shape and points on a target shape.

As can be seen, shape 10' is defined as a first target shape 32, whereas shape 12' is defined as a second target shape 34. These target shapes are converted into bit maps, which when used in conjunction with the bit map of the reference shape, permits the specifying of the displacements from points on the bit map to bit maps representing each of the target shapes.

In one embodiment, the displacements from the bit map of the target shape to the bit map of the reference shape are defined in terms of the end points of Coulomb warp lines 38 and 40 between the reference shape 24 and target shape 10'. The generation of these Coulomb warp lines will be discussed in connection with FIG. 4.

Figure 4:
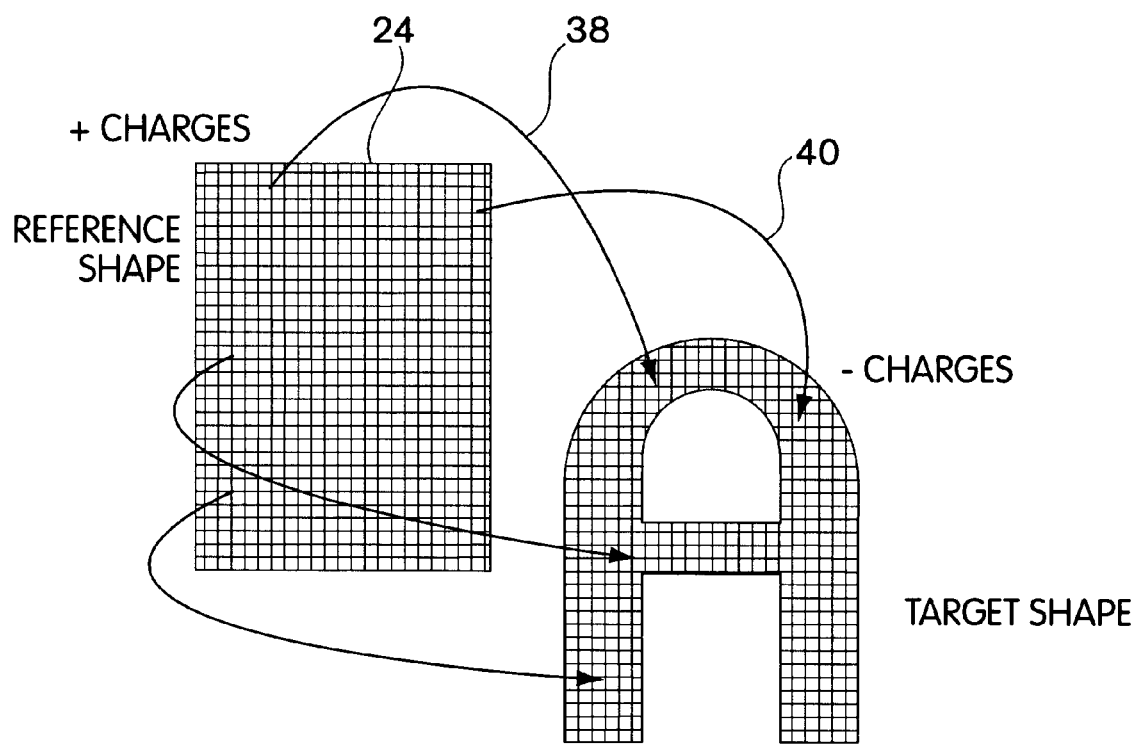
FIG. 4 is a diagrammatic representation of the formation of a Coulomb warp, in which displacements from the reference shape to the target shape are defined by the end points of Coulomb-based force curves from the reference shape to the target shape.

Referring now to FIG. 4, it will be seen that reference shape 24 is comprised of grid lines, the intersection of two grid lines defining a point on the reference shape. A corresponding point on the target shape is defined by force lines or Coulomb warp lines, in this case lines 38 and 40, which are derived from treating the point on the reference shape which is the origin of the force line as having a unit positive charge and with the position at which the force line lands on the target shape as having a negative charge. As with electrostatic theory, the path would be that of an electron going from the reference shape to the target shape along a path determined by the Coulomb forces involved.

More particularly, utilizing ideal particles, there are many possible warp maps that can be generated. In order for the model to work well, one wants similar warps to represent similarly shaped letters. In order to accomplish this, one can use a physical model. If one gives each particle of the reference shape a unit positive charge, and each pixel of the target letter a negative charge proportional to its gray-level intensity, then if the total charge of the target letter is set equal to the total charge of the reference shape, one can track the electrostatic force lines from each particle of the reference shape to where it would intersect the plane of the target shape, set to be in front of and parallel to the reference shape.

The force lines therefore land in a uniform density over the target shape, resulting in a smooth, dense warp map from each pixel of the reference shape to positions on the target shape. Note that the electrostatic forces are easily calculated from Coulomb's Law, giving rise to the designation Coulomb warp.

Figure 5:
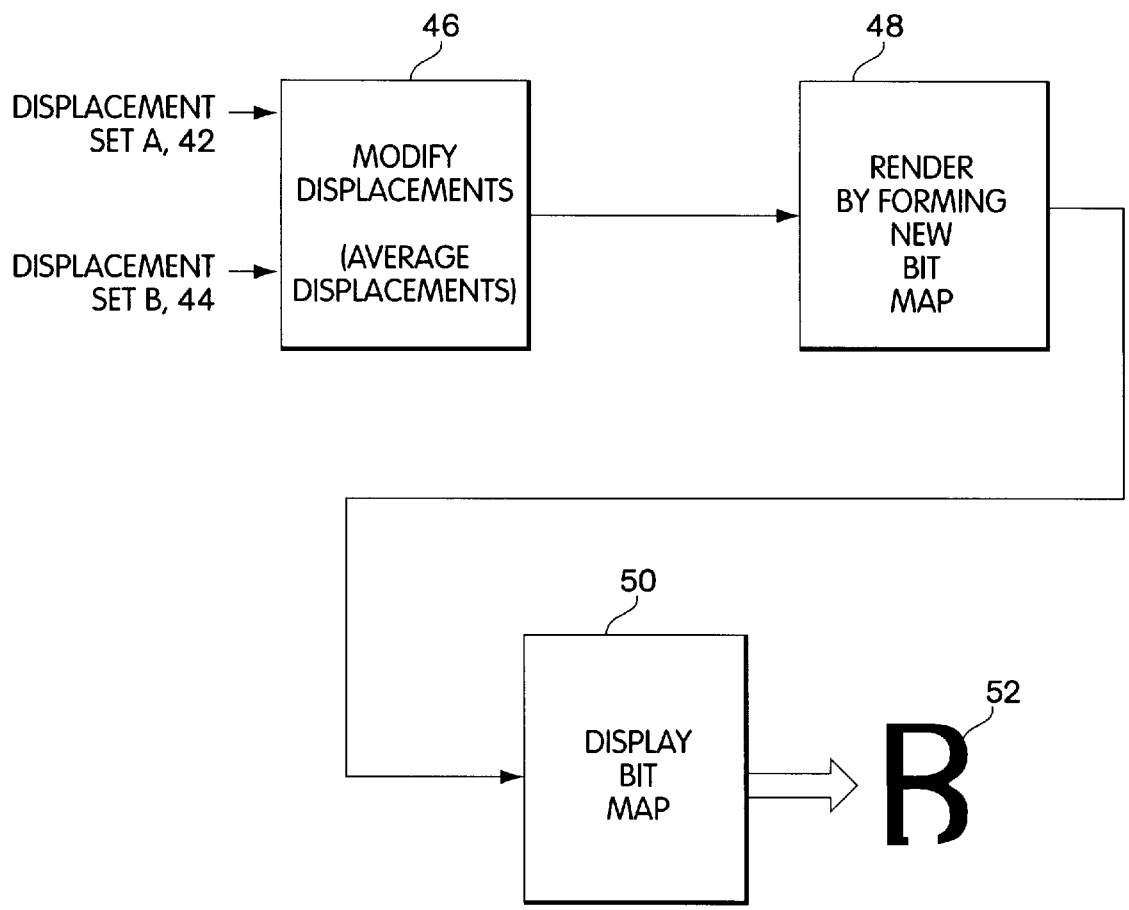
FIG. 5 is a block diagram of the modification of the associated with rendering a new shape through the averaging displacements of two warps, followed by the rendering of the final shape by forming new bit maps and displaying the result.

Referring now to FIG. 5, it is possible to combine shapes by first taking the displacement set for shape A and the displacement set for shape B, here shown respectively at 42 and 44, and modifying the displacements, as illustrated at 46, in one embodiment by averaging the displacements. This means that given a particular point on the reference shape, one adds the displacements from that point in the reference to the displacement from the same place on the reference shape and divides by two. This averages the displacements to provide a new bit map 48 for rendering the new shape. The formation of the new bit map is then displayed at 50 to provide a rendering of the resulting shape as illustrated at 52.

Figure 6:
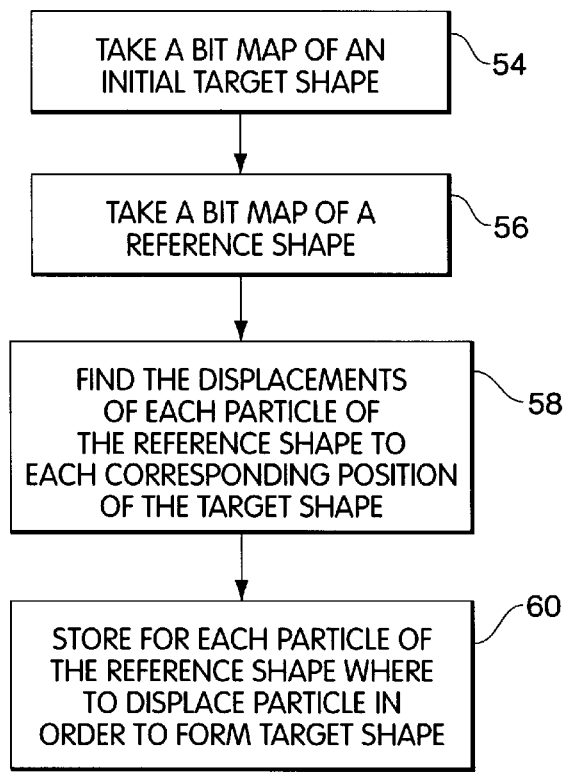
FIG. 6 is a flow chart illustrating the steps in the transformation of a shape into a Coulomb warp representation, manipulation of the warp and the rendering of the result in terms of the conversion back to a bit map; and, FIG. 7 is a diagrammatic representation of a nearest neighbor method of forming a warp.
Figure 6:
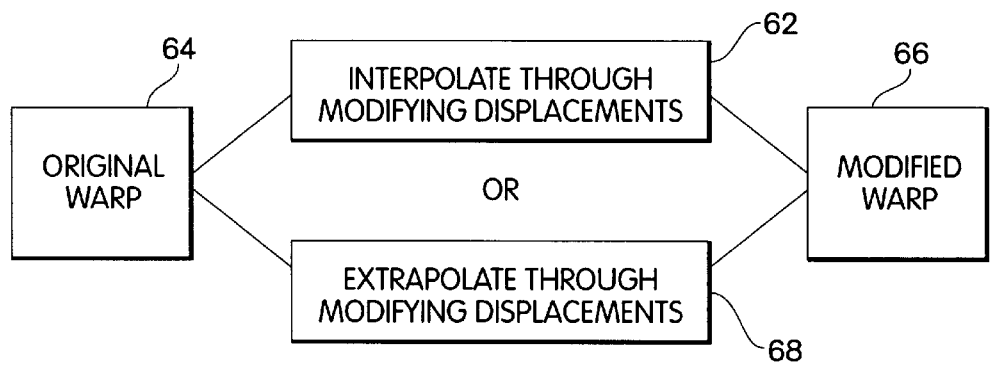
Figure 6:

Referring to FIG. 6, the steps involved for taking a shape and transforming it into a Coulomb warp representation are first, as illustrated at 54, to take a bit map of an reference target shape. What one then does is take a bit map of a reference shape, shown at 56, followed by finding the displacements of each particle of the reference shape to each corresponding position of the target shape, as illustrated at 58. The result is then stored for each particle of the reference shape as to where to displace the particle in order to form the target shape, as illustrated at 60.

In order to manipulate the shapes, one provides a manipulation transform in which, as illustrated at 62, one interplates through modifying displacements either by utilizing the original warp, as illustrated at 64, or the modified warp, a illustrated at 66, and extrapolating through modifying displacements, as illustrated at 68, thus to render a result through the conversion back to a bit map, as illustrated at 70.

Figure 7:
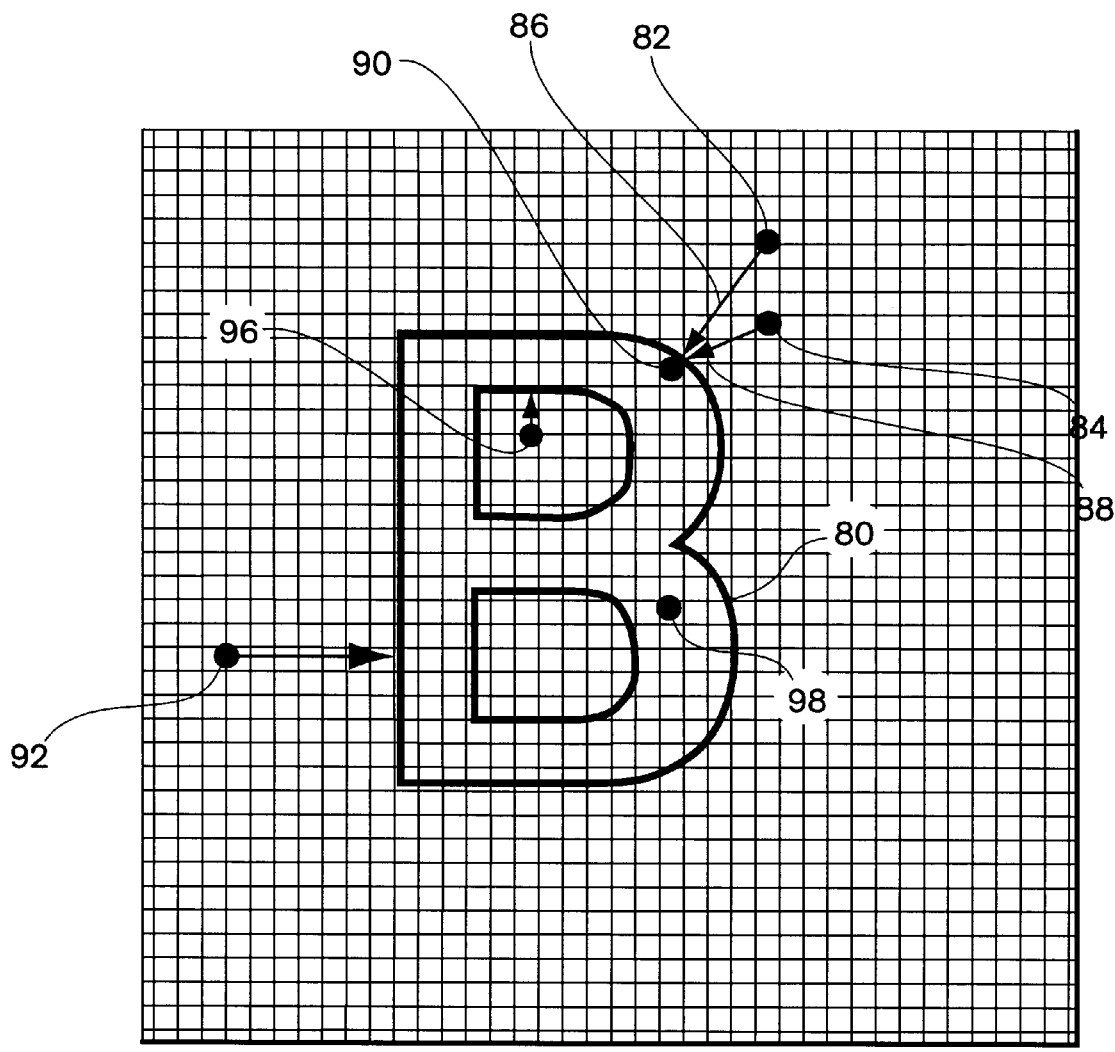

It will be appreciated that while the Coulomb warp method described above is one method for forming a warp, as illustrated in FIG. 7, assuming a shape 80 to be that of the letter B, then one can obtain the displacements by choosing various points 82 and 84 and deciding which is the nearest neighbor. Having ascertained the nearest neighbor, one determines the displacement by measuring the distances as illustrated by arrows 86 and 88 to a particular point 90 on shape 80.

While this nearest neighbor approach works well at points well outside of the shape such as points 82 and 84 and indeed point 92, for points inside the shape, but in a void, as illustrated at point 96, there is an ambiguity as to which point on the interior of shape 80, point 96 is closest to. Also, particles bunch up at the edges of the shape to be represented, which can cause problems in shape interpolation.

Thus, while a nearest neighbor approach provides satisfactory results, the Coulomb warp approach results in a smooth warp which can give better map results and produces less ambiguity when deriving the warp itself.

A program listing for shape modification is now presented.

*Appendix*

```
%% demo.m
%% april 28, 1997  freeman created
%% Main program to demonstrate (1) forming Coulomb warp representation
%% (2) manipulating shapes within that representation, and (3)
%% converting the modified shape back to a normal bitmap representation.
%%
%% To use a nearest neighbor warp, change the variable "mode" inside
%% of get_reps.m
% mode = 1 means nearest neighbor map.
% mode = 0 means coulomb warp map.

%% load-in and convert to coulomb warp representation
%% the alphabet in chicago font.  Store the results in files.
trial = 1;
%% get_reps
%% Load-in and convert the alphabet in zaphchancery font.
trial = 2;
%% get_reps %% Load-in the Coulomb warp representation for all the fonts.
coulomb_flag = 1; n_char = 62; load_flag = 1;
[fonts, n_train_alphabets, ld, rd] = load_fonts(load_flag, coulomb_flag, n_char);

figure;

%% Get the coulomb warp representations for Chicago (tmp1) and
%% Zaphchancery (tmp2) fonts.
i = 1;
tmp1 = fonts((i-1)*rd(1)*n_char + (1:rd(1)*n_char) ,:);
i = 2;
tmp2 = fonts((i-1)*rd(1)*n_char + (1:rd(1)*n_char) ,:);

%% Find an average shape of the letters in two different fonts,
%% by averaging the Coulomb warp resentations for each set of letter.
tmp3 = (tmp1 + tmp2) / 2;

%% Now plot all the results:  bitmaps of the two original letters, and
%% the coulomb-warp-averaged representation (after converting all 3 to
%% a bitmap pixel representation.
n_let_show = 10;
total_plots = 3;
for j = 1:n_let_show
  i = 1;
  subplot(n_let_show, total_plots, (j-1)*total_plots + i);
  display_letter(tmp1( (j-1)*rd(1) + (1:rd(1)), :), rd, coulomb_flag);
  if (j == 1)
    title('chicago font');
  end i = 2;
  subplot(n_let_show, total_plots, (j-1)*total_plots + i);
  display_letter(tmp2( (j-1)*rd(1) + (1:rd(1)), :), rd, coulomb_flag);
  if (j == 1)
    title('zaphchancery font');
  end
```

–10–

Appendix

```
i = 3;
subplot(n_let_show, total_plots, (j-1)*total_plots + i);
display_letter(tmp3( (j-1)*rd(1) + (1:rd(1)), :), rd, coulomb_flag);
if (j == 1)
  title('Coulomb warp average');
end
%% Note that averaging the letters within a pixel or bitmap
%% representation would simply give a "double exposure" of the
%% two letter shapes being averaged.  Here, we arrive at something
%% that is much closer to an average of the two shapes being averaged.
end
```

Appendix

```
%% get_reps.m
%% loop through all letters of interest in a given font,
%% and store the coulomb warp representation for each one.

%% Sept. 16, 1996  freeman created.
%% Dec. 2, 1996  freeman updated for new fonts.
%% jan. 10, 1997  freeman updated to fix arbitrary offset
%%               found in the font data.

dir = '/homes/freeman/images/style/fonts.big/';

if (trial == 1)
  font_name = 'chicago';
elseif (trial == 2)
  font_name = 'zaphchancery';
elseif (trial == 3)
  font_name = 'times';
elseif (trial == 4)
  font_name = 'mistral';
elseif (trial == 5)
  font_name = 'timesbold';
elseif (trial == 6)
  font_name = 'monaco';
elseif (trial == 7)
  font_name = 'britannic_bold';
elseif (trial == 8)
  font_name = 'century_gothic';
elseif (trial == 9)
  font_name = 'courier_new';
elseif (trial == 10)
  font_name = 'footlight_MT_light';
elseif (trial == 11)
  font_name = 'New_York';
elseif (trial == 12)
  font_name = 'optima';
elseif (trial == 13)
  font_name = 'playbill';
elseif (trial == 14)
  font_name = 'stencil';
end outdir = ['/homes/freeman/images/style/coulomb/' font_name '/'];

%% do coulomb warp, not nearest neighbor warp
mode = 0;

%% letter dimensions, ld
ld = [38, 38];
n_char = 62;
disp(sprintf('Reading in font files...'))
%% jan. 10, 1997  include offset for the new fonts.
off = zeros(14,1); off(9) = 15; off(11) = 12; off(7) = 15;
foo = read_image([dir font_name '.big']);

if (trial < 7)
  font = [foo(off(trial) + (1:ld(1)*36),:); ...
```

-12-

Appendix

```
      foo(off(trial)+(45*ld(1)+1:(n_char+9)*ld(1)),:)];
else
  font = foo(off(trial) + (1:ld(1)*n_char,:);
end figure;
for index = index_mat
  digit = num2str(index);
  if (index < 10)
    digit = ['0' num2str(index)];
  end
  %% To let me know if this is working...
  if (exist([outdir digit '.mat']) == 2)
          disp(sprintf([outdir digit '.mat' ' exists, skipping to next...']));
  end
  %% only make this representation if the file doesn't exist already
  if (exist([outdir digit '.mat']) == 0)
    disp(sprintf(['working on ' outdir digit '.mat']));
    map = get_letter(index, ld, font);
    [let_i, let_j] = get_representation(map, mode);
    outcmd = ['save ' outdir digit ' let_i let_j'];
    eval(outcmd);
  end
end
```

-13-

*Appendix*

```
%%  read_image.m  reads image data from a specified formatted file
%%      file format: a directory, with data and descriptor files
%%      inside it. (vismod/schreiber lab format).
%%
%% Nov. 30, 1995 freeman created
function [A, count] = read_image(string)

string = remove_space(string);
[dim, scale, pedestal, data_files] = read_descriptor(string);

fid = fopen([string '/data']);
[A, count] = fread(fid, [dim(2), dim(1)]);
A = A';

%% apply scale and pedestal, if appropriate
if (scale ~= []) & (pedestal ~= [])
        A = A * scale + pedestal;
end fclose(fid);
```

*Appendix*

```
%% display_letter.m  display a letter (array let) in a figure.
%%  Handles both coulomb warp representation, and pixel representations.
function display_letter(let, rd, coulomb_flag)

%% History:  feb. 5, 1997 freeman created.

if coulomb_flag
 normalized_display(...
   render_antialiased(let(1:rd(1)/2, :), let(rd(1)/2+(1:rd(1)/2), :), 4, 0));
else
 normalized_display(let);
end
```

Appendix

```
function [warp_map_i, warp_map_j] = get_representation(to_bitmap, mode)
%
% Find the shape representation for a bitmap.  Generates
% a warp map for how to distort a rectangular set of pixels
% of the same size into the "on" pixels of the to_bitmap.
% Hopefully, will be a good representation for linear operations
% on letters.
% mode = 1 means nearest neighbor map.
% mode = 0 means coulomb warp map.

% sept. 5, 1996  freeman created.  See notes for get_representation.m

% Find the warp map connecting the from to the to bitmaps.
% See p. 1037 b wtf red notes.
% The model: The ON pixels of the from_bitmap represent positive charges.
% (the from bitmap is a rectangular set of pixels of the size of the
% to_bitmap, all of which are ON pixels.)
%         The ON pixels of the to_bitmap represent negative charges.
% (you jiggle the densities to have the same total charge in the from
% as the to bitmaps.  This method has obvious extensions to greyscale
% images, too.)
% The output is a translation vector for each (ON) pixel of the
% from_bitmap, which is the position on the to_bitmap where an
% infinitessimal test charge would end up if it were released from the
% particular position on the from_bitmap.
% The idea: we let the physics handle the correspondence problem to
% make a nice, reasonable warp from one bitmap to the other.
% The hope: that the resulting set of warps from a canonical
% rectangle of charges to each of the shapes to be represented would
% linearly interpolate nicely, and have all the desireable properties
% described by Beymer and Poggio.
% All *map* variables are arrays of the same dimensionality.
% k_dist is k_distance between capacitor planes.
% k_step_size is the path integration step size.

%% This program uses the full, start-to-finish charge mapping.
%% Should be slower than starting from half-way, but it may be more
%% accurate.

from_bitmap = ones(size(to_bitmap));

if (mode)
  [warp_map_i, warp_map_j] = get_nn_map(from_bitmap, to_bitmap);
else
  %% works adequately.  k_step_size = 1 works better...
  k_dist = 100;
  k_step_size = 2;
  [warp_map_i, warp_map_j] = get_charge_map(from_bitmap, to_bitmap, k_dist, k_step_size);
end
```

*Appendix*

```
function [mat] = get_letter(index, ld, font)
% get_letter returns matrix with specified letter as array,
% But not clipped, as I used to make it.
% sept. 5, 1996 freeman created.

mat = -font((index-1)*ld(1)+1:index*ld(1),:);
mat = mat - min(min(mat));
mat = mat / max(max(mat));
```

Appendix

```
function [warp_map_i, warp_map_j] = get_charge_map(from_bitmap, to_bitmap, k_dist, k_step_size)
%
% Find the warp map connecting the from to the to bitmaps.
% See p. 1037 b wtf red notes.
% The model:  The ON pixels of the from_bitmap represent positive charges.
%             The ON pixels of the to_bitmap represent negative charges.
% (you jiggle the densities to have the same total charge in the from
%  as the to bitmaps.  This method has obvious extensions to greyscale
%  images, too.)
% The output is a translation vector for each (ON) pixel of the
% from_bitmap, which is the position on the to_bitmap where an
% infinitessimal test charge would end up if it were released from the
% particular position on the from_bitmap.
% The idea:  we let the physics handle the correspondence problem to
% make a nice, reasonable warp from one bitmap to the other.
% The hope:  that the resulting set of warps from a canonical
% rectangle of charges to each of the shapes to be represented would
% linearly interpolate nicely, and have all the desireable properties
% described by Beymer and Poggio.
% All *map* variables are arrays of the same dimensionality.
% k_dist is k_distance between capacitor planes.
% k_step_size is the path integration step size.

% sept. 3, 1996  freeman created.

% check that bitmap dimensions agree (not necessary, but makes things
% simpler).  Also, check that each bitmap has some mass..
if (sum((size(from_bitmap) == size(to_bitmap))) ~= 2)
  disp(sprintf('input bitmaps not of the same size, function get_charge_map'));
  break;
end
if ((sum(sum(from_bitmap)) == 0) | (sum(sum(to_bitmap)) == 0))
  disp(sprintf('either from or to bitmap has no mass..., function get_charge_map'));
  break;
end % initializations
[dim_i, dim_j] = size(from_bitmap);
warp_map_i = zeros(size(from_bitmap));
warp_map_j = zeros(size(from_bitmap));
from_k = 0;
to_k = k_dist;
tmp_i = 0; tmp_j = 0;

% equalize total charge on the two bitmaps.  Density is a multiplier
% on the bitmap densities themselves.
from_density = 1;
to_density = -sum(sum(from_bitmap))/ sum(sum(to_bitmap));

for i = 1:dim_i
  disp(sprintf('line %d of charge map...', i));
  for j = 1:dim_j
    if (from_bitmap(i,j) ~= 0)
      [tmp_i, tmp_j] = ...
       path_integrate(i,j, from_k, to_k, k_step_size, from_bitmap, ...
                from_density, from_k, to_bitmap, to_density, to_k);
```

-18-

```
        %% make this be a warp offset, not an absolute coordinate.
        warp_map_i(i,j) = tmp_i - i;
        warp_map_j(i,j) = tmp_j - j;
    end
  end
end
```

Appendix

```
%% remove_space.m   remove blank spaces at the front of a text string.
function [out_str] = remove_space(in_str);

len = length(in_str);
first = max((len:-1:1) .* (' ' ~= in_str));
out_str = in_str( (len-first)+1:len );
```

Appendix

```
%% read_descriptor.m
%%     Reads the descriptor file of a vismod format image.
%%     Returns the relevant information.
%% Nov. 30, 1995 freeman created
function [dimensions, scale, pedestal, data_files] = read_descriptor(string)

fid = fopen([string '/descriptor']);
%% read info
count = 1;

while count ~= 0
    [A, count] = fscanf(fid, '%s, \n');
    if strcmp(A, '(_dimensions') | strcmp(A, '(dimensions')
            [dimensions, count] = fscanf(fid, '%d %d');
    elseif strcmp(A, '(_scale') | strcmp(A, '(scale')
            [scale, count] = fscanf(fid, '%f');
    elseif strcmp(A, '(_pedestal') | strcmp(A, '(pedestal')
            [pedestal, count] = fscanf(fid, '%f');
    elseif strcmp(A, '(_data_files') | strcmp(A, '(data_files')
            [data_files, count] = fscanf(fid, '%d');
    end
end fclose(fid);
```

Appendix

```
%% load_fonts.m   auxiliary function for ext.m.  Load in font data.
%%   Switches between pixel representations.
%% History:  feb. 3, 1997  freeman created.

function [raw_fonts, n_train_alphabets, ld, rd] = ...
            load_fonts(load_flag, coulomb_flag, n_char);

%% letter dimensions, ld
ld = [38, 38];
%% representation dimensions (for either pixel or vector warp representation)
if coulomb_flag
  rd = [2*ld(1), ld(2)];
else
  rd = ld;
end;
%% n_train_alphabets = 5;
%% for a simple print-out of averaging two different fonts...  april
%% 28, 97, wtf
n_train_alphabets = 1;
raw_fonts = [];

if coulomb_flag
  % character arrays need to have the same number of elements...
  load_font = ['load     /homes/freeman/images/style/coulomb/chicago/'; ...
            'load   /homes/freeman/images/style/coulomb/zaphchancery/'; ...
            'load     /homes/freeman/images/style/coulomb/times/'; ...
            'load     /homes/freeman/images/style/coulomb/mistral/'; ...
%%          'load     /homes/freeman/images/style/coulomb/timesbold/'; ...
            'load /homes/freeman/images/style/coulomb/britannic_bold/'; ...
            'load     /homes/freeman/images/style/coulomb/monaco/'];
  disp(sprintf('Reading in Coulomb warp font files...'))
  for font = 1:n_train_alphabets+1
    disp(sprintf([' font %d:   ' load_font(font,:)], font))
    tmp_font = [];
    for i = 1:n_char
      digit = num2str(i);
      if (i < 10)
        digit = ['0' num2str(i)];
      end
      cmd = [load_font(font,:) digit];
      eval(cmd);
      tmp_font = [tmp_font; let_i; let_j];
    end
    raw_fonts = [raw_fonts; tmp_font];
  end
else
  suffix = '.blur/';
%%  suffix = '/';
  % character arrays need to have the same number of elements...
  load_font = ['    /homes/freeman/images/style/fonts.big/chicago.big'; ...
          '  /homes/freeman/images/style/fonts.big/zaphchancery.big'; ...
          '      /homes/freeman/images/style/fonts.big/times.big'; ...
          '      /homes/freeman/images/style/fonts.big/mistral.big'; ...
%%        '    /homes/freeman/images/style/fonts.big/timesbold.big'; ...
          ' /homes/freeman/images/style/fonts.big/britannic_bold.big'; ...
          '      /homes/freeman/images/style/fonts.big/monaco.big'];
```

-22-

Appendix

```
disp(sprintf('Reading in bitmap font files...'))
for font = 1:n_train_alphabets+1
  disp(sprintf([' font %d:  ' [load_font(font,:) suffix]], font))
  tmp = 255 - read_image([load_font(font,:) suffix]);
  %% for chicago, move the font down 4 pixels.
  if (font == 1)
    tmp = [zeros(4,rd(2)); tmp];
  end
  raw_fonts = [raw_fonts; tmp([1:36*rd(1), 45*rd(1):(n_char+9)*rd(1)],:)];
 end
end
disp(sprintf('Done reading fonts.'))
```

Appendix

```
%% normalized_display.m   function displays a matrix
%%     as an image, auto-scaling the matrix from min to max.
%%
%% May 8, 1996 freeman created.

function normalized_display(mat);

mat = mat - min(min(mat));
if (max(max(mat)) == 0)
  disp(sprintf('matrix has zero range.'));
else
  mat = mat * 127.0 / max(max(mat));
  image(mat);
  colormap(gray(128));
  axis off;
end
```

*Appendix*

```
function [rendered] = render_antialiased(i_map, j_map, zoom, thresh)
% function renders a warp map in an anti-aliased fashion.
% Resulting bitmap is of the same resolution, but anti-aliased.
% thresh == 0 means default threshold.

% sept. 9, 1996 freeman created.

[i_dim, j_dim] = size(i_map);
big_dims = [zoom*i_dim, zoom*j_dim];
from_bitmap = ones(size(i_map));

big = warp(i_map, j_map, from_bitmap, big_dims, zoom, zoom);

%% specify the interpolating filter...
fact = 20;
fact = 10;
tmp = pascal(zoom * fact);
filt = diag(tmp(zoom*fact:-1:1,:));

% normalize the filter strength
filt = filt / sqrt(sum(filt .* filt));

big = conv_x(big, filt);
big = conv_y(big, filt);

%% subsample
rendered = big(zoom-1:zoom:zoom*i_dim, zoom-1:zoom:zoom*j_dim);

% default threshold
if (thresh == 0)
  thresh = max(max(rendered)) / 1.7;
end

%% clip at some appropriate point.  thresh==0 means no clipping
if ~(thresh == 0)
  mask = rendered > thresh;
  rendered = (~mask) .* rendered;
  rendered = rendered + thresh * mask;
end
```

*Appendix*

```
function [warp_map_i, warp_map_j] = get_nn_map(from_bitmap, to_bitmap)
%
% Find the nearest neighbor warp map connecting the from to the to bitmaps.
% Based on comments at my dealer meeting talk on the coulomb warp:
% Try out using just the nearest neighbor map from one letter to the other.

% sept. 16, 1996  freeman created.

% check that bitmap dimensions agree (not necessary, but makes things
% simpler).  Also, check that each bitmap has some mass..
if (sum((size(from_bitmap) == size(to_bitmap))) ~= 2)
  disp(sprintf('input bitmaps not of the same size, function get_nn_map'));
  break;
end if (sum(sum(from_bitmap)) == 0)
  disp(sprintf('from bitmap has no mass..., function get_nn_map'));
  break;
end % initializations
[dim_i, dim_j] = size(from_bitmap);
warp_map_i = zeros(size(from_bitmap));
warp_map_j = zeros(size(from_bitmap));
tmp_i = 0; tmp_j = 0;

%% if nothing in output image, just push all the ink particles off the image.
if (sum(sum(to_bitmap)) == 0)
  warp_map_i = warp_map_i + dim_i + 1;
  warp_map_j = warp_map_j + dim_j + 1;
else
%% otherwise, find the nearest neighbor
  for i = 1:dim_i
    for j = 1:dim_j
      if (from_bitmap(i,j) ~= 0)
        [tmp_i, tmp_j] = find_nr_nbr(i,j, to_bitmap);
        %% make this be a warp offset, not an absolute coordinate.
        warp_map_i(i,j) = tmp_i - i;
        warp_map_j(i,j) = tmp_j - j;
      end
    end
  end
end
```

-26-

*Appendix*

```
function [i, j] = path_integrate(from_i, from_j, ...
     from_k, to_k, dummy, from_bitmap, from_density, ...
     from_bitmap_k, to_bitmap, to_density, to_bitmap_k);
% function path_integrate integrates the path of an infinitessimal
% test charge from one bitmap of charges to the other.

% sept. 4, 1996 freeman created.
% sept. 5 1996 added from_bitmap_k and to_bitmap_k variables,
%              the positions of from and to bitmaps.
% sept. 6, 1996 modified to allow variable step sizes.  Requires a
%              function, get_k_step_size.m    dummy variable kept
%              for now to keep calling uniform...
% sept. 7, 1996  make the step size be the length of step, not the
%              k direction projected length.
%              Changed ijk to vector notation.

debug = 0;
if (debug)
  j_array = [];
  k_array = [];
end force = zeros(3,1);
%% index of current x,y position
ijk = [from_i; from_j; from_k];
force = [0;0;1];
ijk_eval = [0;0;0];
% initialize this before loop...
force_frac = get_k_step(ijk(3), from_bitmap_k, to_bitmap_k) / 1;

index = 0;
iterate = 1;
index_max = 1000;

while (iterate)
  index = index + 1;
  step_size = get_k_step(ijk(3), from_bitmap_k, to_bitmap_k);
  %% point at which to evaluate force:  extrapolate from last position half way to new position
  ijk_eval = ijk + force_frac * force / 2;
  force = get_force(ijk_eval(1), ijk_eval(2), ijk_eval(3) - from_bitmap_k, ...
        from_bitmap, from_density);
  if (debug)
    disp(sprintf(' '));
    tmp_force = get_force(ijk_eval(1), ijk_eval(2), ijk_eval(3), from_bitmap, from_density);
    disp(sprintf('i_eval: %f, j_eval: %f, k_eval: %f', ...
            ijk_eval(1), ijk_eval(2), ijk_eval(3)));
    disp(sprintf('from_force: %f %f %f', force));
    disp(sprintf('*** iteration: %d   step-size: %f', index, step_size));
  end
  force = force + get_force(ijk_eval(1), ijk_eval(2), ijk_eval(3) - to_bitmap_k, ...
     to_bitmap, to_density);
  force_frac = step_size / sqrt(force' * force);

% update the i and j and k positions
  ijk = ijk + force_frac * force;

% stop iteration if  (k > to_k and you're near a charge), or if iteration count too big.
```

-27-

*Appendix*

```
%%  iterate = ~((ijk(3) > to_k) & local_charge(ijk(1),ijk(2),to_bitmap)) ...
%%       & (index < index_max);

iterate = (index < index_max);
 if (ijk(3) > to_k)
  if local_charge(ijk(1),ijk(2),to_bitmap)
    iterate = 0;
    % handle anti-aliasing. scoot over in pixels about the right amount,
    % given the partial on-ness of this pixel.  Make the effective step size, in pixels,
    % be (1-fractional charge).  We'll assume edge pixels are moving basically
    % perpendicularly to the edge here.  (although I could make the
    % step size be 1 in the x-y plane, but there could be situations
    % where that would cause problems.)  This will work most of the
    % time, and seems to err conservatively.

ijk = ijk + force_frac * ...
        (1 - (local_charge(ijk(1),ijk(2),to_bitmap) / max(max(to_bitmap)))) ...
        * force / step_size ;
  end
 end if (debug)
   disp(sprintf('new i: %f, new j: %f  new k: %f', ijk(1), ijk(2), ijk(3)));
   j_array(index) = ijk(2);
   k_array(index) = ijk(3);
 end
end if (debug)
 figure(4);
 plot(j_array(1:index), k_array(1:index));
end i = ijk(1);
j = ijk(2);
```

-28-

Appendix

```
function [warped] = warp(v_i, v_j, bitmap, dims, amplitude, ij_zoom)
%% function [warped] = warp(v_i, v_j, bitmap, dims, amplitude)
%%   Warp the image according to the warp map.  For now, don't do
%%   any interpolation.
%% v_i, v_j is a map of the offsets.
%% bitmap is the bitmap to be warped.
%% dims are the dimensions of the warped image.
%% amplitude is a factor which multiplies the offsets.
%% ij_zoom is for when warping into a higher resolution image;  then
%%    you can set it to the zoom factor.
%% aug. 30, 1996  freeman.

warped = zeros(dims);
[i_dim, j_dim] = size(bitmap);
for i = 1:i_dim
  for j = 1:j_dim
    i_to = round(i * ij_zoom + v_i(i,j) * amplitude);
    j_to = round(j * ij_zoom + v_j(i,j) * amplitude);

%% ignore if warps out of bounds
    if inbounds(i_to,j_to,dims(1),dims(2))
      warped(i_to, j_to) = warped(i_to, j_to) + bitmap(i,j);
    end end
end
```

*Appendix*

```
function [out] = conv_x(image,filt)
% convolve in the x direction
% Handle the shift in matlab properly...
%
% Horrible, horrible end of line handling...!!!  it wraps around onto
% the line before.
% Sept. 9, 1996 freeman created.

[i_dim, j_dim] = size(image);

out = [reshape(image',1,i_dim*j_dim), zeros(1,length(filt))];

out = filter(filt,1,out);
offset = floor(length(filt)/2);
out = out(offset+1:offset+i_dim*j_dim);
out = reshape(out,j_dim, i_dim);
out = out';
```

—30—

*Appendix*

```
function [out] = conv_y(image,filt)
% convolve in the y direction
% Handle the shift in matlab properly...
%
% Horrible, horrible end of line handling...!!!  it wraps around onto
% the line before.
% Sept. 9, 1996 freeman created.

out = conv_x(image',filt);
out = out';
```

Appendix

```
function [flag] = local_charge(i,j,bitmap)
% return the value of some charge near this point
% return 0 otherwise
% sept. 7, 1996 freeman created.

[i_dim, j_dim] = size(bitmap);
i_int = round(i);
j_int = round(j);
flag = 0;

if (inbounds(i_int,j_int,i_dim, j_dim))
  flag = bitmap(i_int,j_int);
end
```

-32-

*Appendix*

```
function [i_nn, j_nn] = find_nr_nbr(i, j, bitmap)
% returns the i,j coordinates of the nearest on pixel in "bitmap"
% to the input coordinate, i,j.
% Sept 16, 1996  freeman created.

% find an array of the squared distances to the input point in question.
[dim_i, dim_j] = size(bitmap);
[j_mat, i_mat] = meshgrid(1:dim_j, 1:dim_i);
i_offset = i - i_mat;
j_offset = j - j_mat;

%% get the r squared matrix
r_sq_mat = i_offset .^2 + j_offset .^2;
% mask it with the "pixels on" matrix
off_mat = (bitmap == 0);
maximum = max(max(r_sq_mat));
% set off pixel distances to maximum distance
r_sq_mat = r_sq_mat .* (~off_mat) + maximum * off_mat;

[value, index] = min(r_sq_mat);
[val, j_nn] = min(value);

i_nn = index(j_nn);
```

−33−

*Appendix*

```
function [k_step_size] = get_k_step(k, from_bitmap_k, to_bitmap_k)
% function returns a step size as a function of k positions.
% Uniform step size until you get near the target bitmap (k >
% break_point fraction of the way from from_bitmap_k to to_bitmap_k)
% Then ramp down in step size linearly from step_max down to step_min.
% sept. 6, 1996  freeman created.
%
diff = to_bitmap_k - from_bitmap_k;
step_min = 0.3;

step_max = 3;
break_point = 0.8;
% stepsize = a frac + b
a = (step_min - step_max) / (1.0 - break_point);
b = step_min - a;

if (diff ~= 0)
  frac = k / diff;
  if ((frac > break_point) & (frac < 1.0))
    k_step_size = a * frac + b;
  elseif (frac >= 1.0)
    k_step_size = step_min;
  else
    k_step_size = step_max;
  end
else
  k_step_size = 0;
end %%  disp(sprintf('k_step_size: %f', k_step_size));

%% a more careful way, go slowly at the start and the finish.  But is
%% it necessary?
%% if (diff ~= 0)
%%   frac = k / diff;
%%   if (frac < 0.2)
%%     k_step_size = scale * frac^2 + step_min;
%%   elseif (frac > 0.8)
%%     k_step_size = scale * (1-frac)^2 + step_min;
%%   else
%%     k_step_size = step_max;
%%   end
%% else
%%   k_step_size = 0;
%% end
```

−34−

Appendix

```
function [force] = get_force(i, j, k, bitmap, density)
% function get_force returns the force at a point i,j
% and a distance k away from the bitmap of charges, "bitmap".
% Calculates by matlab vector, matrix operations, now.
% Density is assumed to be a scalar.  Spatial variations should
% be included via "bitmap".

% sept. 3, 1996 freeman created.

[dim_i, dim_j] = size(bitmap);
% initialize variables
[j_mat, i_mat] = meshgrid(1:dim_j, 1:dim_i);
force = zeros(3,1);
i_offset = i - i_mat;
j_offset = j - j_mat;

%% get the r squared matrix
r_sq_mat = i_offset .^2 + j_offset .^2 + k^2;

%% set anything equal to zero to be 1, just to avoid blow-ups.
r_sq_mat = (r_sq_mat == 0) + r_sq_mat;

r_cubed_mat = r_sq_mat .^ (3/2);

% allows for grey scale bitmap values...
ri_mat = density * bitmap .* i_offset ./ r_cubed_mat;
rj_mat = density * bitmap .* j_offset ./ r_cubed_mat;
rk_mat = density * k * bitmap ./ r_cubed_mat;

force(1) = sum(sum(ri_mat));
force(2) = sum(sum(rj_mat));
force(3) = sum(sum(rk_mat));
```

-35-

What is claimed is:

1. In a graphical manipulation system, a system for combing shapes comprising:

a reference shape, first and second target shapes to be combined;

means for representing said shapes in terms of bit maps made up of particles such that each bit map describes a different shape;

means for providing a warp between said reference shape and said first and second target shapes in terms of the displacement of a particle associated with a point in said reference shape to a corresponding point in each of said target shapes, thereby to represent each target shape with a warp from said reference shape;

means for modifying said displacements to combine said target shapes so as to provide a combined bit map; and, means for rendering a shape based on said combined bit map, thereby to provide a new shape which is the result of combining said warps and thus the combining of said target shapes.

2. The system of claim 1 wherein said warp is a Coulomb warp the use of said Coulomb warp taking a uniform density of particles on said reference shape and providing a uniform density of particles in said target shape, thus to eliminate unpleasing holes and density gradients in said target shape.

3. The system of claim 1 wherein said warp is a nearest neighbor warp.

4. The system of claim 1 wherein said means for modifying said displacements includes means for averaging the displacements from a point on said reference shape to corresponding points on said first and second target shapes.

5. In a graphical manipulation system, a system for combing shapes comprising;

a reference shape, first and second target shapes to be combined;

means for representing said shapes in terms of particles;

means for providing a warp between said reference shape and said first and second target shapes in terms of the displacement of a particle associated with a point in said reference shape to a corresponding point in each of said target shapes thereby to represent each target shape as a warp from said reference shape; and, means for modifying said displacements to combine said shapes and for rendering the result thereof thereby to provide a new shape which is the result of combing said warps and thus the combining of said target shapes.

6. The system of claim 5 wherein said warp is a Coulomb warp the use of said Coulomb warp taking a uniform density of particles on said reference shape and providing a uniform density of particles for said target shape, thus to eliminate unpleasing holes and density gradients in said target shapes.

7. The system of claim 5 wherein said warp is a nearest neighbor warp.

8. The system of claim 5 wherein said means for modifying said displacements includes means for averaging the displacements from a point on said reference shape to corresponding points on said first and second target shapes.

* * * * *